(12) United States Patent
Urano et al.

(10) Patent No.: US 8,502,432 B2
(45) Date of Patent: Aug. 6, 2013

(54) CROSSOVER MODULE

(75) Inventors: Hiroaki Urano, Nishikamo-gun (JP); Kazutaka Tatematsu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 390 days.

(21) Appl. No.: 12/597,732

(22) PCT Filed: Jun. 18, 2008

(86) PCT No.: PCT/JP2008/061510
§ 371 (c)(1), (2), (4) Date: Oct. 26, 2009

(87) PCT Pub. No.: WO2009/001838
PCT Pub. Date: Dec. 31, 2008

(65) Prior Publication Data
US 2010/0060100 A1 Mar. 11, 2010

(30) Foreign Application Priority Data
Jun. 25, 2007 (JP) ................................. 2007-165908

(51) Int. Cl.
*H02K 1/00* (2006.01)
*H02K 11/00* (2006.01)
(52) U.S. Cl.
USPC ....................... 310/179; 310/71; 310/216.115
(58) Field of Classification Search
USPC ..................................... 310/179, 71, 216.115
See application file for complete search history.

(56) References Cited

U.S. PATENT DOCUMENTS

| 6,429,556 | B1 * | 8/2002 | Nakamura et al. | 310/71 |
| 2002/0047365 | A1 * | 4/2002 | Yagyu et al. | 310/71 |
| 2003/0201688 | A1 * | 10/2003 | Yamamura et al. | 310/216 |
| 2004/0183388 | A1 * | 9/2004 | Rittmeyer | 310/179 |
| 2004/0263015 | A1 * | 12/2004 | Okada et al. | 310/194 |
| 2006/0043806 | A1 * | 3/2006 | Torii et al. | 310/71 |
| 2006/0238044 | A1 * | 10/2006 | Miya et al. | 310/71 |
| 2007/0007832 | A1 * | 1/2007 | Ichikawa et al. | 310/71 |
| 2007/0096571 | A1 * | 5/2007 | Yuratich | 310/87 |
| 2007/0103014 | A1 * | 5/2007 | Sumiya et al. | 310/71 |
| 2007/0170792 | A1 * | 7/2007 | Bott et al. | 310/71 |

FOREIGN PATENT DOCUMENTS

| JP | 62-166744 A | 7/1987 |
| JP | 2001-103700 A | 4/2001 |
| JP | 2004-153874 A | 5/2004 |
| JP | 2004-194367 A | 7/2004 |
| JP | 2005-304244 A | 10/2005 |
| JP | 2006-020490 A | 1/2006 |
| JP | 2006-333685 A | 12/2006 |
| JP | 2007-060743 A | 3/2007 |

* cited by examiner

*Primary Examiner* — Tran Nguyen
*Assistant Examiner* — Alex W Mok
(74) *Attorney, Agent, or Firm* — Sughrue Mion, PLLC (57) ABSTRACT

Provided is a crossover module, which can facilitate the process of manufacturing a stator. The crossover module (20) is a module having crossovers (23) for connecting such coils (13) electrically with each other as are mounted on a stator core (11) of a motor (100). The crossover module (20) is constituted such that its shape can be changed between a shape, in which it is mounted on the stator core (11), and a shape, in which it is opened to the outer sides from the former shape.

6 Claims, 8 Drawing Sheets

CROSSOVER MODULE

TECHNICAL FIELD

The present invention relates to a crossover module of a motor.

BACKGROUND ART

There is available a crossover module having a crossover for electrically connecting coils mounted on a stator core of a motor.

Figure 7:
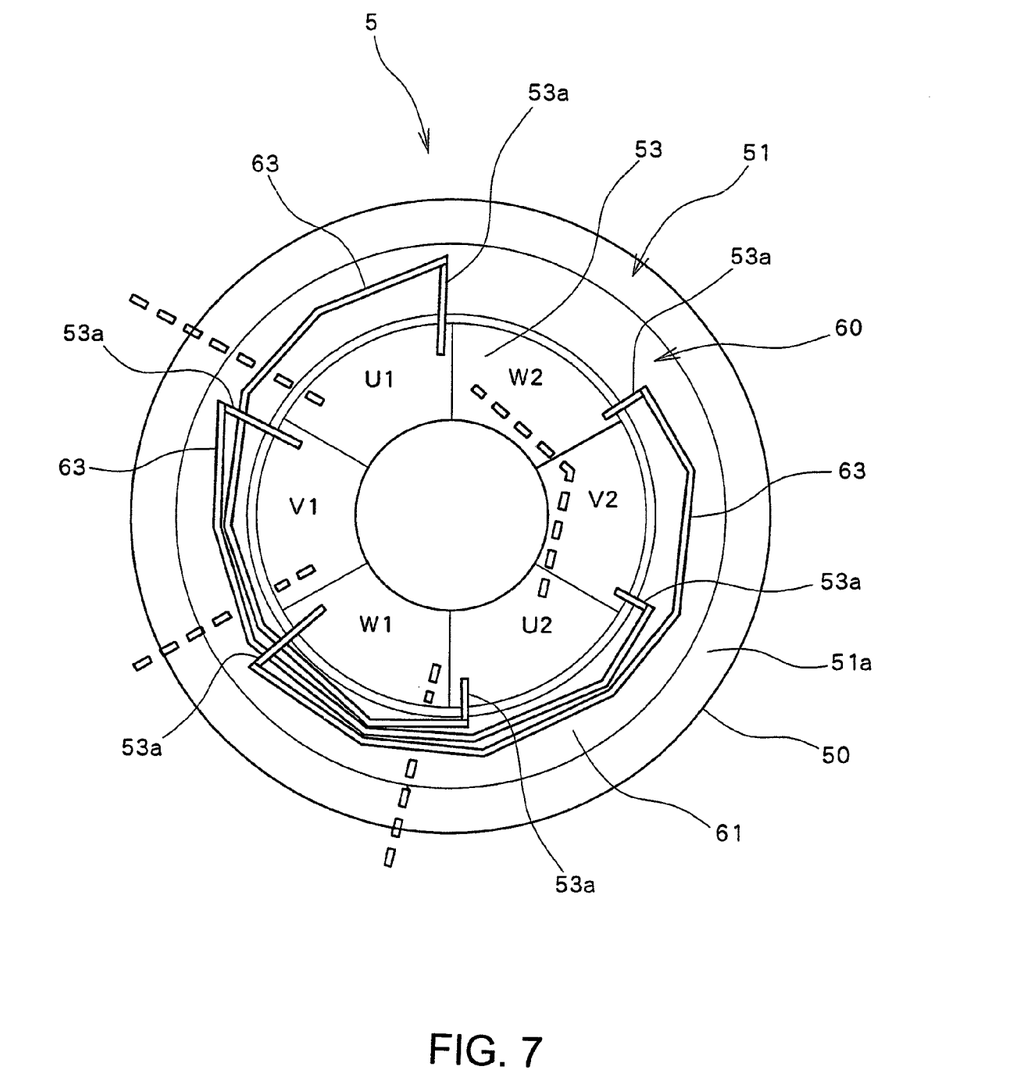
FIG. 7 is a schematic top view showing an example structure of a conventional stator.
Figure 8:
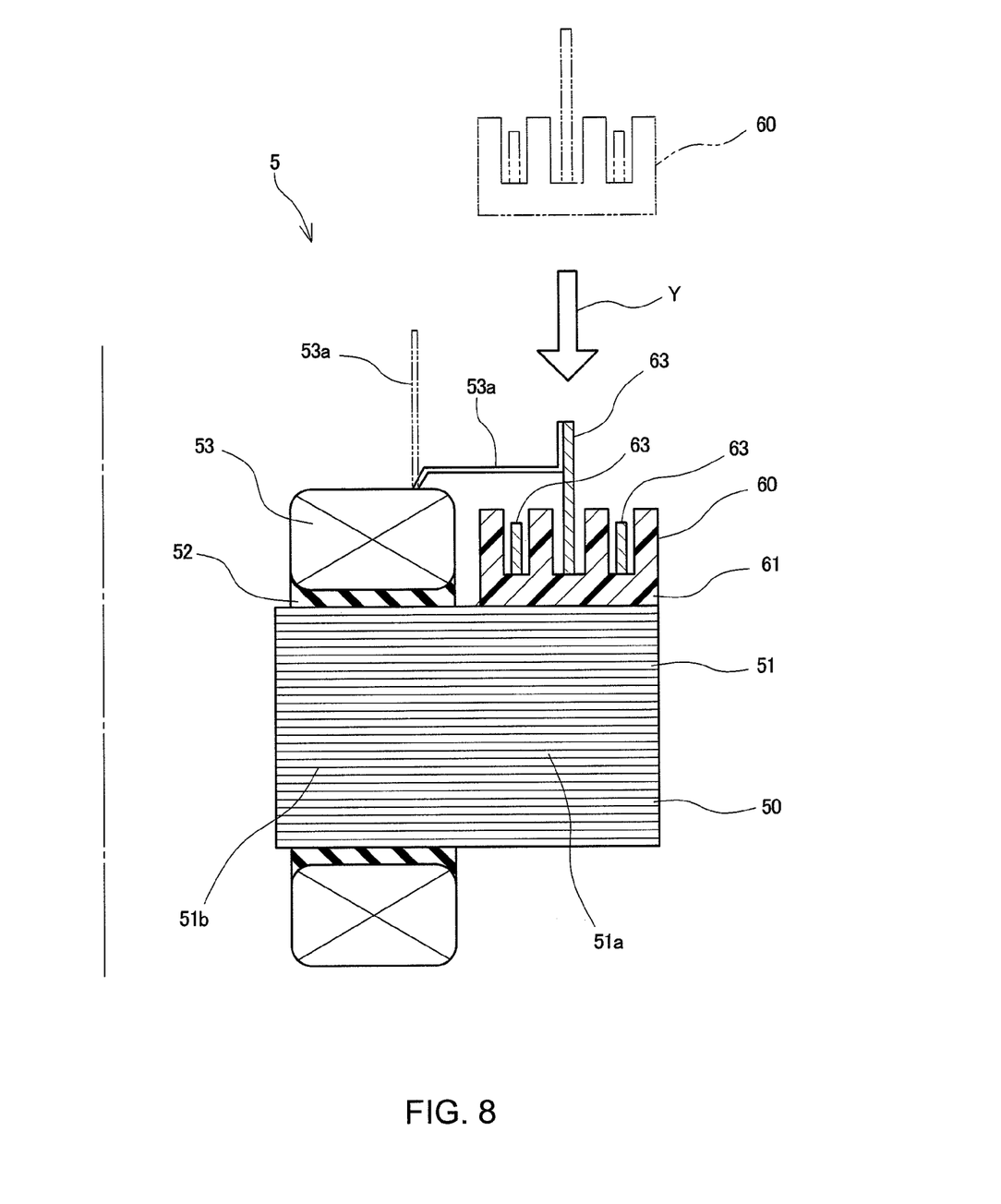
FIG. 8 is a schematic cross sectional view showing an example structure of a conventional stator.

FIG. 7 is a schematic top view showing one example structure of a conventional stator 5, and FIG. 8 is a schematic cross sectional view of the same.

As shown in FIGS. 7 and 8, the stator 5 comprises a stator main portion 50 and a crossover module 60, the latter being mounted on the former.

In FIGS. 7 and 8, the stator main portion 50 comprises a ring-like stator core 51, and coils 53 which are wound around teeth 51b of the stator core 51 with an insulating member 52 in-between, in a concentrated winding manner. An end of the coil 53 constitutes a leader line 53a which is extracted to be connected to the crossover module 60. Before the crossover module 60 is mounted on the stator main portion 50, the leader line 53a extends along the axial direction (upper direction in FIG. 8) of the stator core 51, as indicated by the long dashed double-short dashed line in FIG. 8, so as not to hinder the process of mounting the crossover module 60.

In FIGS. 7 and 8, the crossover module 60 comprises a ring-like crossover-holding member 61 made of insulating resin and a crossover 63 held on the crossover-holding member 61.

The crossover module 60 is mounted on the stator main portion 50, as is described below. That is, the crossover module 60 is brought along the axial direction of the stator core 51 (the upper direction in FIG. 8) while being mounted on a ring-like yoke portion 51a of the stator core 51. In FIG. 8, the crossover module 60 before being mounted is indicated by the long dashed double-short dashed line, and that after being mounted is indicated by the solid line. The arrow Y in FIG. 8 indicates the direction in which the crossover module 60 is moved. With the crossover module 60 mounted on the stator core 51, the leader line 53a is bent outward in the radial direction, as indicated by the solid line in FIG. 8, and electrically connected to the crossover 63.

Note that Japanese Patent Laid-open Publication No. 2006-20490, Japanese Patent Laid-open Publication No. 2001-103700, Japanese Patent Laid-open Publication No. 2004-194367, and Japanese Patent Laid-open Publication No. 2006-333685 disclose a structure in which a crossover is placed outside a coil end of a stator coil in the radial direction.

Patent Document 1: Japanese Patent Laid-open Publication No. 2006-20490
Patent Document 2: Japanese Patent Laid-open Publication No. 2001-103700
Patent Document 3: Japanese Patent Laid-open Publication No. 2004-194367
Patent Document 4: Japanese Patent Laid-open Publication No. 2006-333685

DISCLOSURE OF THE INVENTION

In the structure shown in FIGS. 7 and 8, it is necessary to bend a coil end after a crossover module is mounted on a stator core, which results in a complicated manufacturing process.

To address the above, the present invention provides a crossover module capable of simplifying a stator manufacturing process.

A crossover module according to the present invention is a crossover module having a crossover for electrically connecting coils mounted on a stator core of a motor and formed so as to be capable of changing in shape between the shape thereof when mounted on the stator core and the shape thereof when opened outward from that shape.

A crossover module according to the present invention is a crossover module having a crossover for electrically connecting coils mounted on a stator core of a motor and having a substantially ring-like shape which is disconnected at one position thereof, and a moving portion capable of bending outward in a radial direction.

According to one aspect of the present invention, the crossover may be a rectangular wire and placed such that the width direction of the rectangular wire is placed substantially parallel to the axial direction of the crossover module.

A crossover module according to the present invention is a crossover module, comprising: an insulating crossover-holding member having a substantially ring-like shape and a crossover-holding groove formed therein extending in a circumferential direction; and a crossover held in the crossover-holding groove, for electrically connecting coils mounted on a stator core of a motor, wherein the crossover-holding member is divided in the circumferential direction into two substantially arc-like portions, one ends of the two portions (hereinafter referred to as connection ends) are connected to each other such that the two portions can mutually rotate about an axial direction, an insulating piece is formed projecting from the connection end of one of the two portions so as to extend toward the other side and separating the crossover and the stator core, and a space for accepting the insulating piece is formed on the connection end of the other portion.

A motor according to the present invention is a motor comprising: a stator core; a plurality of coils mounted on the stator core; and any of the above-described crossover modules for electrically connecting the coils, wherein the coils are edge-wise coils.

A motor according to the present invention is a motor comprising: a stator core; a plurality of coils mounted on the stator core; and any of the above-described crossover modules for electrically connecting the coils, wherein the crossover module is placed outside a coil end of each of the coils in a radial direction.

According to the present invention, there can be provided a crossover module capable of simplifying a stator manufacturing process.

DESCRIPTION OF REFERENCE NUMERALS 1 stator, 10 stator main portion, 11 stator core, 11a yoke portion, 11b teeth, 12 insulating member, 13 coil, 13a coil leader line, 13b power line, 13c neutral conductor, 20 crossover module, 21 crossover-holding member, 22u, 22v, 22w crossover-holding groove, 23u, 23v, 23w crossover, 23a terminal, 24 moving portion, 25, 26 arc-shaped portion 25a, 26a connection end, 25b insulating piece, 26b space, 27 axial portion.

BEST MODE FOR CARRYING OUT THE INVENTION

Below, an embodiment of the present invention will be described by reference to the drawings.

Figure 1:
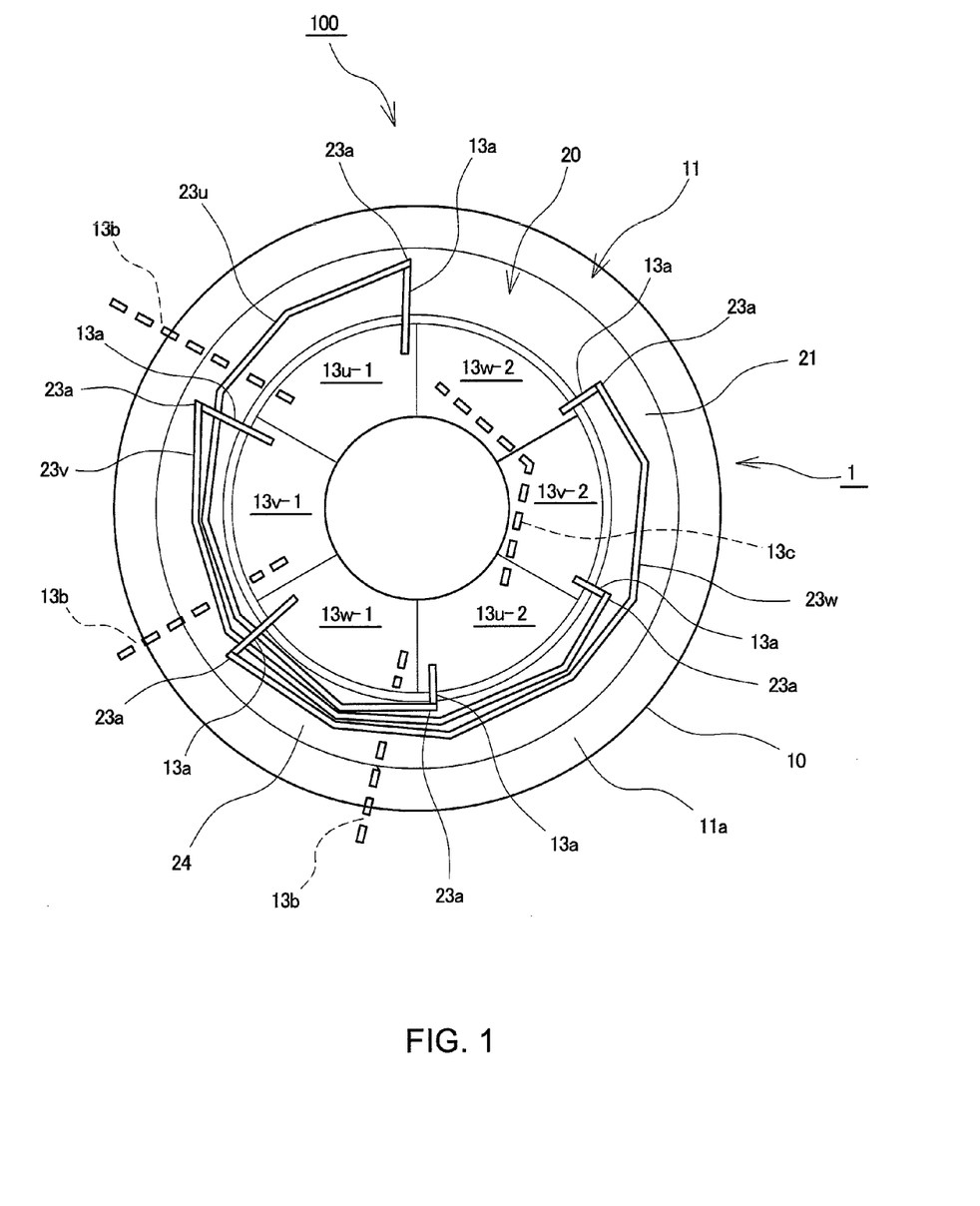
FIG. 1 is a schematic top view showing an example structure of a motor having a crossover module according to an embodiment of the present invention.
Figure 2:
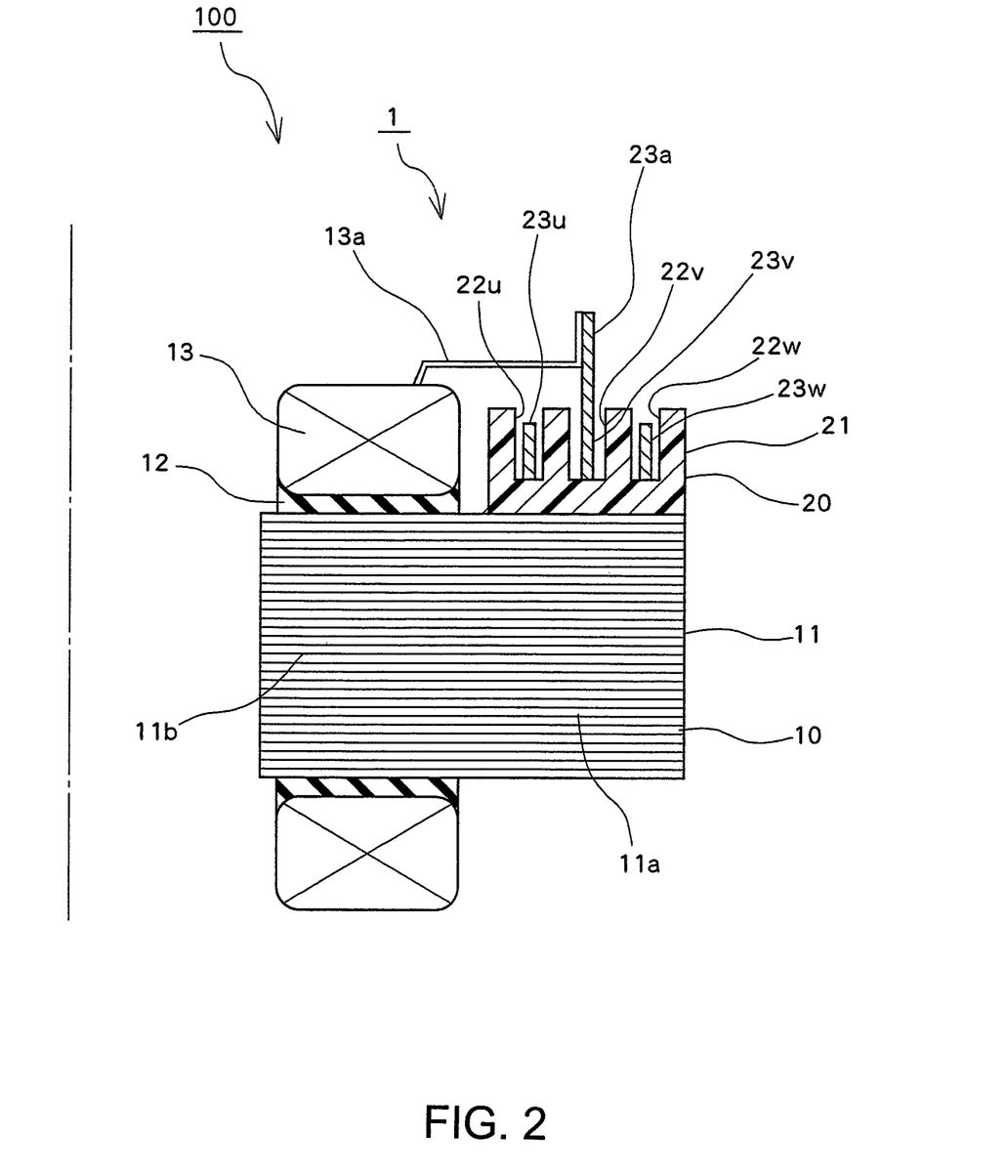
FIG. 2 is a schematic cross sectional view of the same.

FIG. 1 is a schematic top view showing an example structure of a motor 100 including a crossover module according to the present embodiment. FIG. 2 is a schematic cross sectional view of the same.

In FIGS. 1 and 2, the motor 100 comprises a substantially ring-like stator 1 and a rotor (not shown) placed on the inner circumferential side of the stator 1.

The stator 1 comprises a substantially ring-like stator main portion 10, and a crossover module 20 mounted on the stator main portion 10.

The stator main portion 10 has a substantially ring-like stator core 11. The stator core 11 has a substantially column-like yoke portion 11a and a plurality of (here, six) teeth 11b provided inside the yoke portion 11a with a predetermined interval so as to extend toward the central axis. The six teeth 11b are respectively wound by U, V, W phase coils 13u-1, 13v-1, 13w-1, 13u-2, 13v-2, and 13w-2 (thereinafter referred to as "coils 13") via an insulating member 12, in a concentrated winding manner. Note that, in this embodiment, the coils 13 are edge-wise coils formed by winding a rectangular wire.

The crossover module 20 is a module having a crossover for electrically connecting the coils 13 mounted on the stator core 11 of the motor. In this embodiment, the crossover module 20 is placed outside coil ends of the coil 13 in the radial direction.

The crossover module 20 has a substantially ring-like crossover-holding member 21. The crossover-holding member 21 is insulating and is made of insulating resin. U, V, W phase crossover-holding grooves 22u, 22v, 22w are formed on the crossover-holding member 21 so as to extend in the circumferential direction. U, V, W phase crossovers 23u, 23v, 23w (hereinafter collectively referred to as the "crossover 23") are held in the respective crossover-holding grooves 22u, 22v, 22w of the respective phases.

The coils 13 are connected to the crossover 23 as described below. That is, as shown in FIGS. 1 and 2, an end of each coil 13 constitutes a coil leader line 13a extracted to be connected to the crossover 23. Each coil leader line 13a extends outward in the radial direction. Meanwhile, a terminal 23a is formed on each of both ends of each crossover 23, projecting in the axial direction. The corresponding coil leader line 13a is connected to each terminal 23a by means of welding, caulking, or the like. Specifically, a coil leader line 13a of the coil 13u-1 is connected to the terminal 23a on one end of the crossover 23u; and a coil leader line 13a of the coil 13u-2 is connected to the terminal 23a on the other end of the same. Further, a coil leader line 13a of the coil 13v-1 is connected to the terminal 23a on one end of the crossover 23v; and a coil leader line 13a of the coil 13v-2 is connected to the terminal 23a on the other end of the same. Still further, a coil leader line 13a of the coil 13w-1 is connected to the terminal 23a on one end of the crossover 23w; and a coil leader line 13a of the coil 13w-2 is connected to the terminal 23a on the other end of the same. That is, the crossover 23u connects the two u-phase coils 13u-1 and 13u-2 to each other in series; the crossover 23v connects the two v-phase coils 13v-1 and 13v-2 to each other in series; and the crossover 23w connects the two w-phase coils 13w-1 and 13w-2 to each other in series.

Note that the other ends of the respective coil leader lines 13a of the coils 13u-1, 13v-1, 13w-1 are extracted outward in the radial direction and constitute power lines 13b. The other ends of the respective coil leader lines 13a of the coils 13u-2, 13v-2, 13w-2 are mutually connected and constitute a neutral conductor 13c.

In this embodiment, in order to simplify the process of forming the coils 13, the crossover module 20 is formed so as to be capable of changing in shape between the shape thereof when mounted on the stator core 11 and the shape thereof when opened outward (specifically, outward in the radial direction) from that shape. In the above, the crossover module 20 may be able to change in shape in two ways between the above-described two shapes, although the crossover module 20 capable of changing in shape at least from the shape thereof when open to the shape thereof when mounted is sufficient.

Specifically, the crossover module 20 has a substantially ring-like shape which is disconnected at one position thereof and has a moving portion 24 capable of bending outward in the radial direction. The two ends of the disconnected portion may be in contact with each other or may remain apart from each other. That is, the crossover module 20 may be a completely closed ring or a partial ring with a portion thereof cut off with respect to the circumferential direction.

In this embodiment, the crossover 23 is a rectangular wire, and to make it easier to bend, is placed such that the width direction of the rectangular wire is placed substantially parallel to the axial direction of the crossover module 20. That is, the crossover 23 is placed such that the wider surface of the rectangular wire is placed substantially parallel to the axial direction of the stator core 11.

Figure 3:
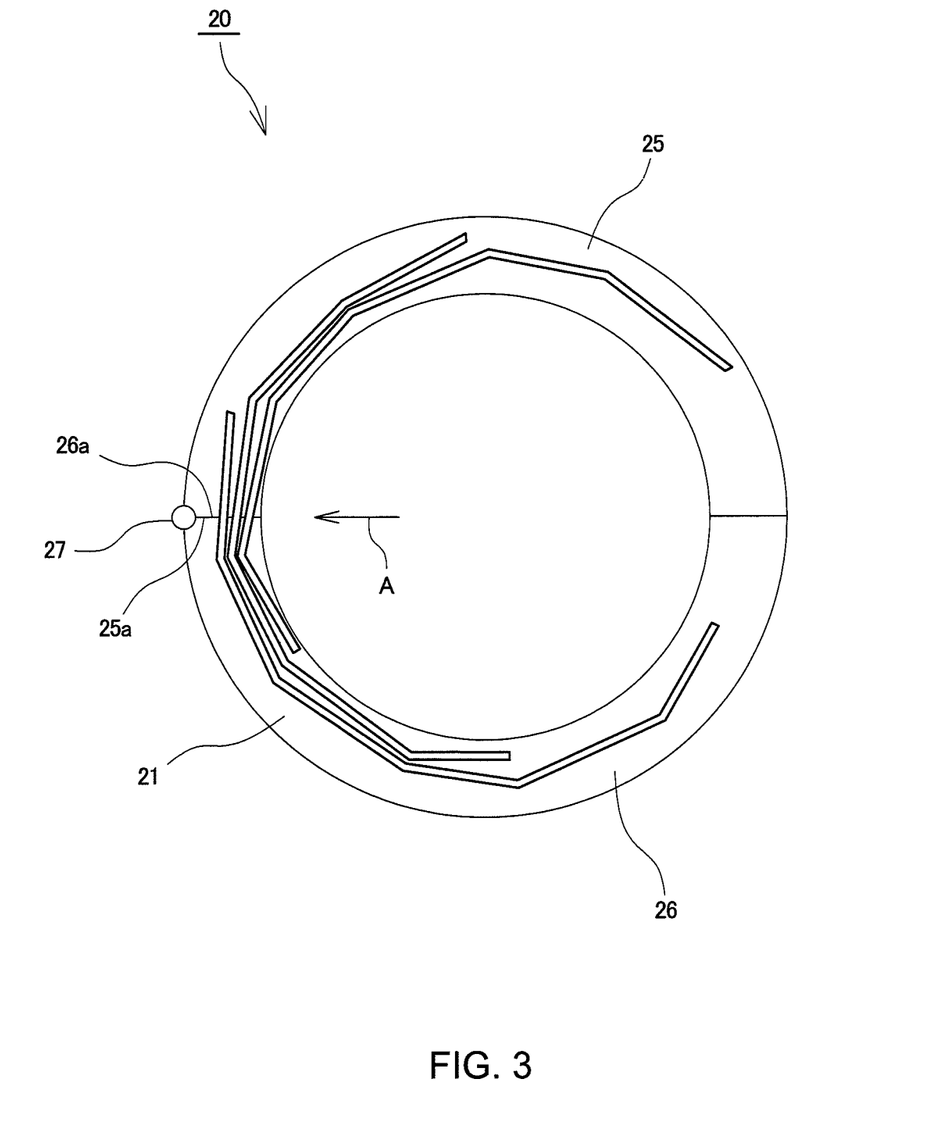
FIG. 3 is a top view showing an example structure of a crossover module according to the embodiment.
Figure 4:
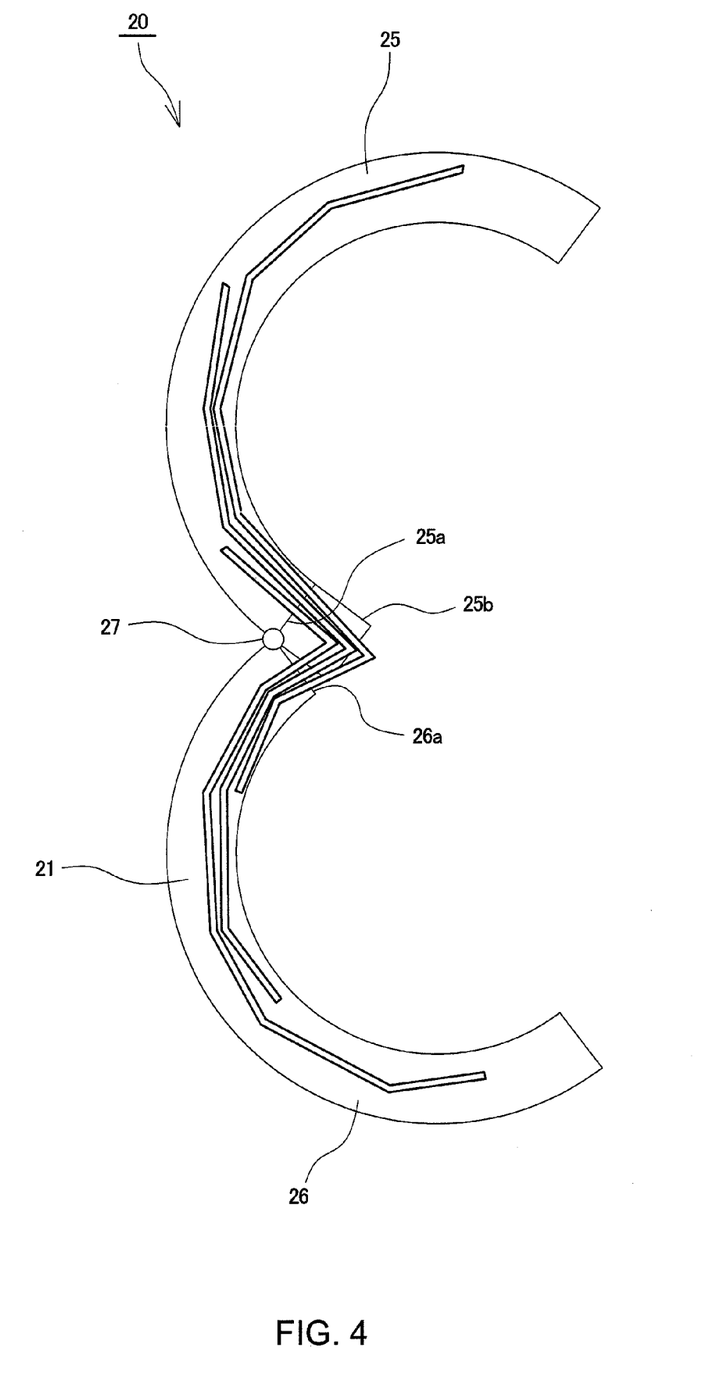
FIG. 4 is a top view showing an example structure of a crossover module according to the embodiment.

FIGS. 3 and 4 are top views showing an example structure of a crossover module 20 according to the present embodiment. FIG. 3 shows the crossover module 20 mounted on the stator core 11; and FIG. 4 shows the crossover module 20 opened outward from that shape.

In FIGS. 3 and 4, the crossover-holding member 21 is divided in the circumferential direction into two substantially arc-shaped portions 25, 26. Respective one ends 25a, 26a of the two portions 25, 26 (hereinafter referred to as a "connection end") are connected to each other so that the two portions 25, 26 can rotate about the axial direction. Specifically, portions on the outer circumference of the connection ends 25a, 26a of the two portions 25, 26 are connected to an axial portion 27 so as to rotate about the axial direction.

In order to ensure an insulating distance between the crossover 23 and the stator core 11 in the connecting portion between the two portions 25, 26, an insulating piece 25b is provided projecting from the connection end 25a of the portion 25 of the two portions 25, 26 toward the other portion 26, and separating the crossover 23 and the stator core 11. Meanwhile, a space 26b (not shown in FIGS. 3 and 4) for accepting the insulating piece 25b is formed on the connection end 26a of the other portion 26. The insulating piece 25b may be, e.g., a resin member formed integral to the portion 25.

Figure 5:
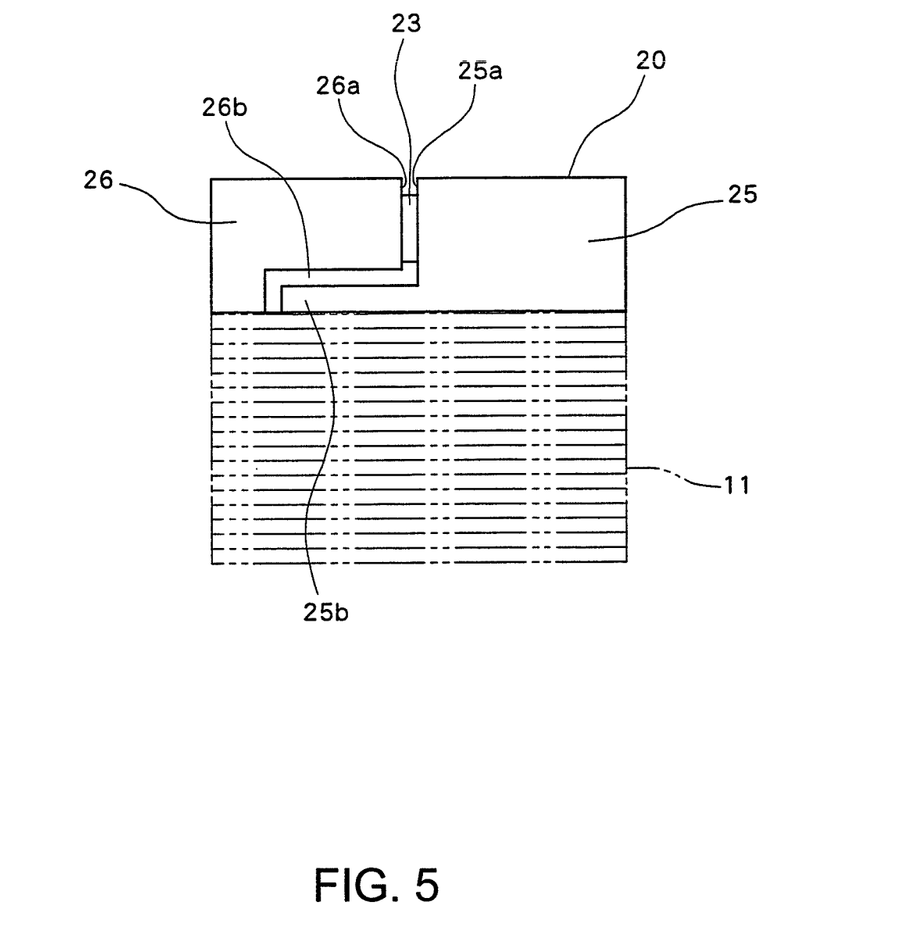
FIG. 5 is a schematic side view showing a connection portion of the crossover module as viewed in the direction indicated by the arrow A in FIG. 3.

FIG. 5 is a schematic side view of the connection portion of the crossover module 20 as viewed from the direction indicated by the arrow A in FIG. 3. As shown in FIG. 5, with the crossover module 20 mounted on the stator core 11, the insulating piece 25b is located between the crossover 23 and the stator core 11, whereby an insulation distance between the crossover 23 and the stator core 11 is ensured. In FIG. 5, the insulating piece 25b on the portion 25 side is inserted in the space 26b on the portion 26 side. Note that, for easiness in understanding, the space between the connection end 25a and the connection end 26a is shown in an exaggerated manner in FIG. 5.

Figure 6:
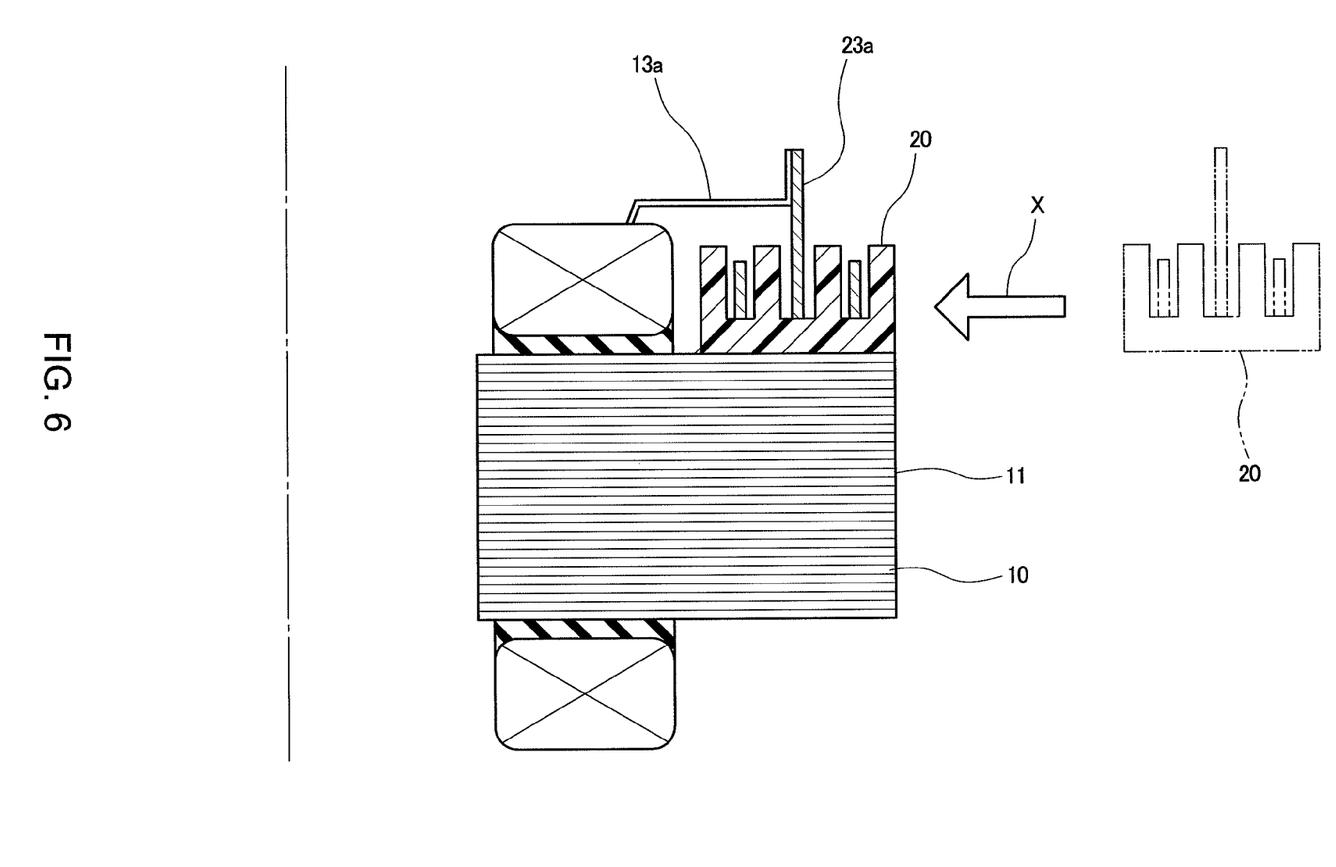
FIG. 6 is a schematic cross sectional view showing a process of mounting a crossover module onto a stator main portion.

FIG. 6 is a schematic cross sectional view showing a process of mounting the crossover module 20 on the stator main portion 10. Below, a process of mounting the crossover module 20 on the stator main portion 10 will be described, with reference to FIG. 6.

Before the crossover module 20 is mounted on the stator main portion 10, the coil leader lines 13a of the respective coils 13 extend outward in the radial direction, as shown in FIG. 6. Formation of such a coil leader line 13a; that is, a process for bending an end of the coil 13, is preferably performed in the process of bending a conductive wire to thereby form the coil 13. Further, preferably, a bending process for forming the power line 13b and the neutral conductor 13c is also performed in the process of bending a conductive wire to thereby form the coil 13.

In mounting, initially, the crossover module 20 in the state of being opened outward (e.g., the state shown in FIG. 4) is placed outside the final setting position of the crossover module 20 in the radial direction, as indicated by the long dashed double-short dashed line in FIG. 6.

Thereafter, the crossover module 20 is closed inward in the radial direction to be resultantly placed in the final setting position on the upper surface of the stator core 11, as indicated by the solid line in FIG. 6. That is, the crossover module 20 is brought to a position between the upper surface of the stator core 11 and the coil leader line 13a from outside in the radial direction. Note that the arrow X in FIG. 6 indicates a mounting direction.

Then, the respective terminals 23a of the crossover module 20 are connected to the respective corresponding coil leader lines 13a.

As described above, in the present embodiment, the crossover module is formed so as to be capable of changing in shape between the shape thereof when mounted on a state core and the shape thereof when opened outward from that shape. Therefore, in the present embodiment, the crossover module can be mounted on the stator core from outside with respect to the radial direction, which can simplify a stator manufacturing process. Specifically, the crossover module 20 can be mounted after the relevant coils are completely bent. This can eliminate the step of bending the coil ends after the mounting, and thus reduce manufacturing cost. In other words, coil end formation can be completed at the step of bending a conductive wire for coil formation, thereby simplifying a coil formation step.

In the present embodiment, the crossover module has a substantially ring-like shape which is disconnected at one position thereof and also has a moving portion which can bend outward in the radial direction. With the above, mounting a crossover module from the outside with respect to the radial direction can be achieved by means of a simple structure.

In the present embodiment, the crossover is a rectangular wire and placed such that the width direction of the rectangular wire is placed substantially parallel to the axial direction of the crossover module. Therefore, the crossover can be easily bent during bending of the crossover module.

In the present embodiment, the crossover module has an insulating crossover-holding member in a substantially ring-like shape having a crossover-holding groove formed thereon extending in the circumferential direction and a crossover held in the crossover-holding groove. The crossover-holding member is divided in the circumferential direction into two substantially arc-like portions, with one ends (connection ends) of the arc-like portions connected to each other such that the two portions can rotate about the axial direction. In this structure, an insulating piece is formed projecting from the connection end of one of the two portions so as to extend toward the other portion side and separating the crossover and the stator core, while a space for accepting the insulating piece is formed on the connection end of the other portion. With the above, an insulating distance between the crossover and the stator core can be ensured in the connecting portion between the two divided portions.

Note that the present invention is not limited to the above described embodiment, and can be modified in various manners within a range not departing from the gist of the present invention.

For example, a structure for enabling change in shape of the crossover module 20 is not limited to the above-described structure, and the crossover module 20 may be formed so as to be capable of changing in shape, utilizing, e.g., elasticity thereof.

The invention claimed is:

1. A crossover module having a crossover for electrically connecting a plurality of coils of a same phase mounted on a stator core of a motor and provided between an end face in an axial direction of the stator core and a coil leader line extracted outward in a radial direction of the stator core from each of the coils, the crossover and the coil leader line being electrically connected to each other to connect the coils of the same phase with each other,
    wherein the crossover module has a substantially ring-like shape which is disconnected at one position thereof and a moving portion capable of bending outward in a radial direction, and
    wherein the coil leader line is preformed to extend in the radial direction of the stator core and has an end preformed in a direction corresponding to a terminal of the crossover for electrically connecting the coil leader line to the terminal of the crossover.

2. The crossover module according to claim 1, wherein the crossover module has, as the crossover, a crossover for electrically connecting the coils mounted on a plurality of teeth extending inside a yoke portion of the stator core in a substantially ring-like shape of the motor, and is provided between an end face in an axial direction of the yoke portion and the coil leader line extracted outward in the radial direction of the stator core from each of the coils.

3. The crossover module according to claim 1, wherein the crossover is a rectangular wire and is placed such that a width direction of the rectangular wire is placed substantially parallel to an axial direction of the crossover module.

4. A motor, comprising:
    a stator core;
    a plurality of coils mounted on the stator core; and
    a crossover module according to claim 1, for electrically connecting the coils,
    wherein the coils are edge-wise coils.

5. A motor, comprising:
a stator core;
a plurality of coils mounted on the stator core; and
a crossover module according to claim 1, for electrically connecting the coils,
wherein the crossover module is placed outside coil ends of the coils in a radial direction.

6. A crossover module, comprising:
an insulating crossover-holding member having a substantially ring-like shape and a crossover-holding groove formed therein extending in a circumferential direction; and
a crossover held in the crossover-holding groove, for electrically connecting coils mounted on a stator core of a motor,
wherein the crossover-holding member is divided in the circumferential direction into two substantially arc-like portions,
one end of each of the two portions, hereinafter referred to as connection ends, are connected to each other such that the two portions are mutually able to rotate about an axial direction,
an insulating piece is formed projecting from the connection end of one of the two portions so as to extend toward the other portion side and separating the crossover and the stator core, and
a space for accepting the insulating piece is formed on the connection end of the other portion.

* * * * *